US011140168B2

(12) United States Patent
Wesseling et al.

(10) Patent No.: US 11,140,168 B2
(45) Date of Patent: Oct. 5, 2021

(54) CONTENT ACCESS VALIDATION SYSTEM AND METHOD

(71) Applicant: Avast Software s.r.o., Prague (CZ)

(72) Inventors: Cees Wesseling, Amsterdam (NL); Jaroslav Nix, Tišnov (CZ); Vojtěch Vobr, Jihlava (CZ); Shareen Racké-Bodha, Duivendrecht (NL)

(73) Assignee: Avast Software S.R.O.

( * ) Notice: Subject to any disclaimer, the term of this patent is extended or adjusted under 35 U.S.C. 154(b) by 0 days.

(21) Appl. No.: 15/213,817

(22) Filed: Jul. 19, 2016

(65) Prior Publication Data

US 2017/0026381 A1    Jan. 26, 2017

Related U.S. Application Data

(60) Provisional application No. 62/195,427, filed on Jul. 22, 2015.

(51) Int. Cl.
  *H04L 29/06*    (2006.01)
  *G06F 16/951*    (2019.01)
  *G06F 21/56*    (2013.01)

(52) U.S. Cl.
  CPC .......... *H04L 63/102* (2013.01); *G06F 16/951* (2019.01); *G06F 21/56* (2013.01);
  (Continued)

(58) Field of Classification Search
  CPC .. G06F 17/30864; G06F 21/56; G06F 16/951; H04L 63/0428; H04L 63/06;
  (Continued)

(56) References Cited

U.S. PATENT DOCUMENTS 7,272,639 B1    9/2007    Levergood et al.
7,383,579 B1 *  6/2008    Catanzano ............. G06F 21/51
                                              726/12
(Continued)

FOREIGN PATENT DOCUMENTS

EP    1089516 B1    11/2006

OTHER PUBLICATIONS

Majumdar et al., Addressing Click Fraud in Content Delivery Systems, May 29, 2007, Published in: INFOCOM 2007. 26th IEEE International Conference on Computer Communications. IEEE, Print ISBN: 1-4244-1047-9.*

(Continued)

*Primary Examiner* — Harunur Rashid
(74) *Attorney, Agent, or Firm* — Kramer Levin Naftalis & Frankel LLP

(57) ABSTRACT

To provide validation information to web publishers indicative of the presence of operational malicious software protection systems on user computing devices, an evaluation system resident on a web publisher server can cause web content, including validation request data, to be transmitted from the publisher server to a computing device. A submission system resident on the computing device can analyze the web content for the validation request data, and can cause the validation information to be transmitted from the computing device to the evaluation system based on the analysis. Upon receiving the validation information, the evaluation system can analyze it to determine the likelihood that content delivered to the computing device will be viewed by a real user (and not by automated computer programs).

32 Claims, 9 Drawing Sheets

(52) U.S. Cl.
CPC .......... *H04L 63/0428* (2013.01); *H04L 63/06* (2013.01); *H04L 63/1416* (2013.01); *H04L 63/1441* (2013.01); *H04L 63/20* (2013.01); *H04L 2463/101* (2013.01)

(58) Field of Classification Search
CPC ............... H04L 63/102; H04L 63/1416; H04L 63/1441; H04L 63/20; H04L 2463/101
USPC .......................................................... 705/14
See application file for complete search history.

(56) References Cited

U.S. PATENT DOCUMENTS

| | | | | |
|---|---|---|---|---|
| 8,065,712 | B1* | 11/2011 | Cheng | H04L 63/105 726/1 |
| 8,087,081 | B1* | 12/2011 | Chun | G06F 21/56 726/22 |
| 2001/0034847 | A1* | 10/2001 | Gaul, Jr. | H04L 63/1433 726/25 |
| 2006/0265493 | A1* | 11/2006 | Brindley | G06Q 30/02 709/224 |
| 2008/0040226 | A1 | 2/2008 | Roker | |
| 2009/0235187 | A1* | 9/2009 | Kim | G06F 17/30905 715/760 |
| 2010/0077444 | A1 | 3/2010 | Forristal | |
| 2012/0090030 | A1* | 4/2012 | Rapaport | H04L 63/1441 726/23 |
| 2013/0019310 | A1 | 1/2013 | Ben-Itzhak et al. | |
| 2013/0166909 | A1* | 6/2013 | Agrawal | H04L 63/123 713/168 |
| 2013/0262628 | A1* | 10/2013 | Sivasubramanian | H04L 61/1511 709/217 |
| 2014/0033272 | A1* | 1/2014 | Harris | G06F 21/577 726/3 |
| 2014/0189069 | A1* | 7/2014 | Gero | H04L 67/2842 709/219 |
| 2015/0067341 | A1 | 3/2015 | Deen et al. | |
| 2015/0113652 | A1 | 4/2015 | Ben-Itzhak et al. | |

OTHER PUBLICATIONS

International Search Report International Application No. PCT/US2016/042941, Filing Date, Jul. 19, 2016, dated Oct. 4, 2016.

* cited by examiner vhs_c6tj16lkhDqo2lhG....NgCk736eGoZEqnaJNNW6dL828D9gPfHzNzx9w1Nw

Fig. 5

| Position | Content Fields |
|---|---|
| 0-31 | SHA256 (hash) of this array from position 32 until the end |
| 32-47 | 16 bytes as a daily device id (a different id can be used each day) |
| 48-63 | 16 bytes reserved for future use |
| 64-71 | 8 bytes little endian integer for signal creation time (e.g., Unix timestamp) |
| 72-79 | 8 bytes little endian integer for expiration time (e.g., Unix timestamp) |

Fig. 6

US 11,140,168 B2

CONTENT ACCESS VALIDATION SYSTEM AND METHOD

CROSS-REFERENCE TO RELATED PROVISIONAL APPLICATION

This application claims the benefit of U.S. Provisional Patent Application No. 62/195,427, filed on Jul. 22, 2015, the disclosure of which is hereby incorporated herein by reference in its entirety.

COPYRIGHT NOTICE

Portions of the disclosure of this patent document contain materials that are subject to copyright protection. The copyright owner has no objection to the facsimile reproduction of the patent document or patent disclosure as it appears in the U.S. Patent and Trademark Office patent files or records solely for use in connection with consideration of the prosecution of this patent application, but otherwise reserves all copyright rights whatsoever.

FIELD OF THE INVENTION

The present invention generally relates to improvements in web-based publishing architectures, wherein web publishers (e.g., advertisers) obtain validation information indicative of the likelihood that content they deliver to user computing devices over the Internet will be viewed by real users.

BACKGROUND OF THE INVENTION

Since the dawn of the Internet, the world wide web has been an increasingly popular forum for publishing content. Organizations and individuals, alike, frequently generate and publish material (e.g., educational information, blog posts, videos, and advertisements) on web sites and portals, most of which are publicly accessible via user computing devices (e.g., PCs or smartphones). As with live beings, however, computing devices can be infected with unwelcome agents. In fact, computer-based viruses, malware, and other automated computer programs (often generated by fraudulent actors, such as hackers) have been a persistent nuisance since the early days of computers. This problem has been exacerbated in the Internet age, since many of these malicious programs are designed to be disseminated over the web. Indeed, upon infecting a device, a malicious program may manipulate the device to conduct unauthorized activities, including, for example, accessing web sites and selectively activating content therein, uploading user sensitive data to foreign web servers, downloading additional unwelcome applications onto the device, and generating and transmitting e-mails (with attached copies of the malicious programs) to other users. This drives the importance of safe web browsing habits and the need for anti-virus and/or anti-malware applications to fend off these malicious applications.

From a web publisher's standpoint, it can be helpful to learn whether a computing device (that is requesting access to web content) is free of infectious software. For instance, many publishers, such as advertisers or ad networks and exchanges, typically implement advertising campaigns on a cost-per-click ("CPC"), cost-per-view ("CPV"), or cost-per-impression ("CPI") basis. Since, in conventional web publishing architectures, publishers have no way of knowing whether computing devices requesting access thereto are protected by anti-virus or other protection software, it is often difficult to determine whether visitor traffic is legitimate, and whether the clicks, views, and/or impressions of advertisements and their associated costs are accurate.

SUMMARY OF THE INVENTION

Generally speaking, it is an object of the present invention to improve over conventional web-based publishing architectures by providing a content access validation system and process that provides validation information to web publishers that can inform the web publishers as to the likelihood that content they deliver to computing devices over the web will be accessed or viewed by real users (and not automated computer program).

In certain embodiments, a validation submission system resident on a user computing device can detect, or otherwise identify, the presence and/or status of a malicious software protection system (e.g., an anti-virus and/or anti-malware application) on the computing device. For example, the submission system can detect or identify an operational malicious software protection system. The submission system can provide protection data indicative of the detected malicious software protection system to a third party server (e.g., an administration or a key server). The third party server can respond to the user computing device with validation information useful for notifying web publishers that the computing device is free of malicious agents. Particularly, an evaluation system resident on a web publisher server can receive validation request data from the third party server, and can include the validation request data in web content delivered to user computing devices. In various embodiments, the validation request data is operative to cause the submission system of the user computing device to provide the validation information to the evaluation system. Upon receiving the web content at the user computing device, the validation submission system can analyze the content for the validation request data, and can cause the validation information to be transmitted to the evaluation system based on the analysis. Upon receiving the validation information at the publisher server, the evaluation system can analyze it to determine whether the computing device is free of malicious agents and, more specifically, whether content delivered to the computing device will likely be viewed by a real user (and not by automated computer programs).

Still other aspects and advantages of the present invention will in part be obvious and will in part be apparent from the specification.

The present invention accordingly comprises the several steps and the relation of one or more of such steps with respect to each of the others, and embodies features of construction, combinations of elements, and arrangement of parts adapted to effect such steps, all as exemplified in the detailed disclosure hereinafter set forth, and the scope of the invention will be indicated in the claims.

BRIEF DESCRIPTION OF THE DRAWINGS

For a fuller understanding of the invention, reference is made to the following description, taken in connection with the accompanying drawings, in which:

FIG. 5 is a portion of an exemplary validation information string, in accordance with an embodiment of the present invention;

FIG. 6 is a table illustrating an exemplary array of contents of a validation information string, in accordance with an embodiment of the present invention;

DETAILED DESCRIPTION OF THE PREFERRED EMBODIMENTS

Figure 1:
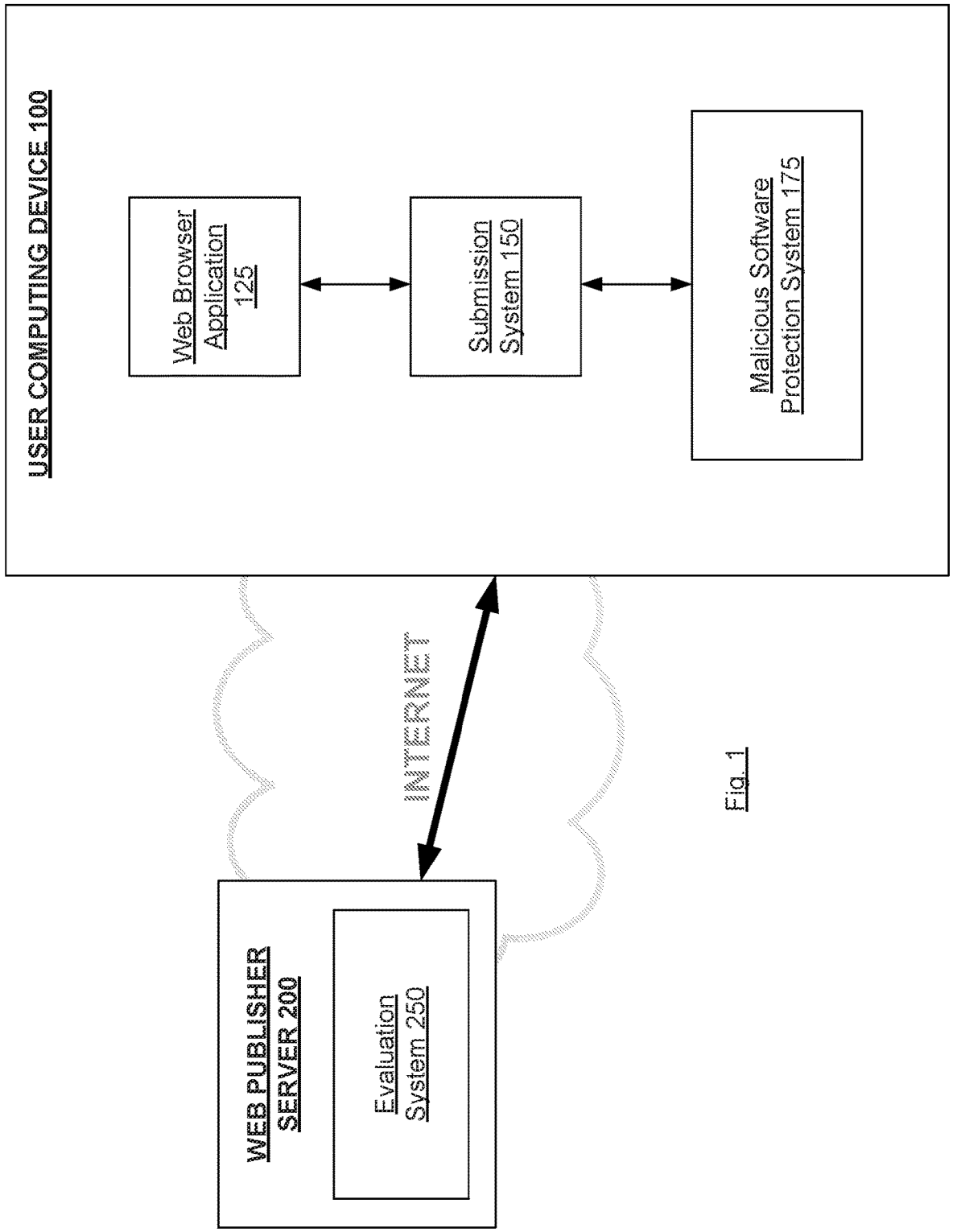
FIG. 1 is schematic diagram illustrating a user computing device in communication with a web publisher server, in accordance with an embodiment of the present invention.

Web publishers e.g., blogs, news or video sites, advertisers, and advertising networks or exchanges) typically deliver web content to user computing devices over the Internet via protocols, such as the hypertext transfer protocol ("HTTP") and/or hypertext transfer protocol secure ("HTTPS"). Users access such content via web browser applications installed on their computing devices. FIG. 1 illustrates a user computing device 100 in communication with a web publisher server 200 over the Internet. User computing device 100 can be any client computing device (such as, for example, a desktop computer, a laptop computer, a notebook computer, a tablet computer, a smartphone, a personal digital assistant, or the like) that includes a processor (e.g., a microprocessor or other data processing device) and memory (e.g., non-volatile memory, volatile memory, or both). Depending on its configuration, computing device 100 may include multiple processors and memories. Computing device 100 can include one or more operating systems configured to execute software applications or systems, such as a web browser application 125, a validation submission system 150, and a malicious software protection system 175. Publisher server 200 can be any server configured to communicate with computing devices over the Internet. Publisher server 200 can similarly include one or more processors and memories, and can be equipped with one or more operating systems configured to execute software applications, such as, for example a validation evaluation system 250 and one or more web applications that employ HTTP, HTTPS, or similar Internet protocols to process web-based requests received from computing devices and transmit web content in response to those requests.

Browser application 125 of computing device 100 can be any software application that provides an interface (e.g., with one or more "windows") for receiving user inputs (e.g., user instructions to access uniform resource locators or "URLs") and displaying content retrieved from the web. Browser application 125 can, for example, feature tabbed viewing of web pages, where multiple web sites are accessible via individual browser tabs.

Submission system 150 can be communicatively coupled to browser application 125 and other web-based applications resident on computing device 100. According to various embodiments, submission system 150 includes validation software (e.g., logic code) implemented in one or more modules. Submission system 150 can, for example, be integrated with or configured to function seamlessly with existing web communication protocols (e.g., HTTP or HTTPS) employed by browser application 125 to output web-based requests and process received web content. For example, submission system 150 can, via the processor(s) of the computing device, send instructions and data to the other web-based applications, and receive instructions and data therefrom.

The validation software can be configured to detect the presence and/or status of a malicious software protection system, such as protection system 175, on computing device 100. Protection system 175 can include an anti-virus and/or anti-malware application (e.g., AVG AntiVirus) that detects, blocks, and/or removes malicious software, such as, for example, viruses, malware, and other automated computer programs (e.g., bots) that may be present on computing device 100. In some embodiments, protection system 175 continuously runs (e.g., in the background) whenever computing device 100 is powered ON. The validation software can detect the presence of protection system 175 by, for example, generating and transmitting one or more instructions to the processor(s) of computing device 100 to search for protection system 175. The validation software can similarly determine the status of protection system 175 (if it is installed on computing device 100) by, for example, generating and transmitting one or more instructions to the processor(s) to query protection system 175 for its current operational status (e.g., to determine whether it is active, partially active, inactive, or expired). The validation software can be configured to detect the presence and/or status of protection system 175 continuously or periodically (e.g., once every hour, once a day, etc.). Alternatively, the validation software can be configured to detect the presence and/or status when instructed or when a predetermined event occurs (e.g., when a web-based request s output by browser application 125, when web content is received from a web publisher server, whenever computing device 100 is switched ON, etc.).

In various embodiments, submission system 150 is also configured to generate or provide validation information (or signals) indicative of the detected presence and/or status of protection system 175, or the lack thereof. The validation information can, for example, include data indicating that a protection system is installed on computing device 100, that no protection system is installed, that a protection system is installed and operational, that a protection system is installed, operational, and has detected and deactivated (e.g., quarantined) or removed one or more malicious software programs, or that a protection system is installed, operational, has detected one or more malicious software programs, but has been unable to deactivate or remove them.

According to preferred embodiments, submission system 150 is additionally configured to process web-based requests output by browser application 125, prior to the transmission thereof to target web servers over the Internet. The validation software can, for example, encode a web-based request with the validation information. Additionally, or alternatively, the validation software can append the validation information to the web-based request. In either scenario, submission system 150 includes the validation information in web (e.g., HTTP or HTTPS) traffic without affecting the overall operation and/or function of web browser application 125. That is, for example, submission system 150 can monitor all incoming and outgoing web traffic (e.g., web-based requests and web content), and can encode the validation information therein. By including validation information in web-based requests to web servers, web publishers can gauge the likelihood that content to be delivered to user computing devices will be viewed by real users. That is, for example, if the validation information indicates that protection system 175 is present on computing device 100, the likelihood that computing device 100 is free of malicious software programs (which might otherwise compromise the computing device's web applications, e.g., browser application 125, and make unapproved requests over the Internet) is high, and the likelihood that web content delivered to computing device 100 is accessed by and/or will be viewed by a real user is also high.

It is to be appreciated that submission system 150 need not be a standalone system. For example, in certain embodiments, submission system 150 is included as part of protection system 175 (e.g., as one or more software modules embedded with or communicatively coupled to other anti-virus or anti-malware modules of system 175). In this scenario, submission system 150 is not configured to detect the presence of protection system 175, but only detects the operational status thereof. Moreover, protection system 175 can (through its virus and/or malware detection and removal algorithms as well as submission system 150) both protect computing device 100 from malicious software and monitor web traffic to submit validation information to publisher server 200. As another example, submission system 150 can alternatively be included as part of or as a plug-in of browser application 125. Regardless of the configuration of submission system 150, in various embodiments, the submission system is configured to run continuously (e.g., in the background) when computing device 100 is ON. Furthermore, submission system 150 can perform its functions regardless of the web browser application employed by computing device 100.

According to various embodiments, evaluation system 250 of publisher server 200 includes evaluation software (e.g., logic code), implemented in one or more modules, and integrated with or configured to function seamlessly with web applications on publisher server 200. For example, evaluation system 250 can be communicatively coupled to those web-based applications, and can send/receive instructions and/or data therefrom. The evaluation software can, for example, include logic code that instructs the processor(s) of publisher server 200 to parse, or otherwise, scan incoming web-based requests for data formatted or presented in a predefined manner (e.g., presented in a predetermined validation information format and/or located in a predetermined file header). The presence of validation information in or with a web-based request can, for example, suggest a high likelihood that content to be transmitted to computing device 100 will be viewed by a real user. In various embodiments, evaluation system 250 additionally causes, e.g., via one or more commands to the processor(s) of publisher server 200, or more particularly, its web-based applications) to transmit different content (e.g., protected or enhanced) to computing device 100 than would otherwise be transmitted if no validation information is included in the web-based request.

It is to be appreciated that submission system 150 can generate the validation information in any suitable manner. In one embodiment, the validation software generates this information by setting one or more flags. For example, submission system 150 can set one flag if protection system 175 is present on computing device 100, and set another flag if protection system 175 is not present. In other embodiments, submission system 150 retrieves the validation information from a third party validation administration system, for example, after confirming to the third party system (e.g., via one or more communications) that protection system 175 is present and active. In these scenarios, the presence of validation information in a transmission to evaluation system 250 can be sufficient to indicate that computing device 100 is protected by protection system 175. That is, evaluation system 250 can, for example, conclude that there is a high likelihood that content delivered to computing device 100 will be viewed by a real user (and not an automated computer program).

Although only a single user computing device and web publisher server is shown in FIG. 1, any number of user computing devices (e.g., each equipped with a content access submission system, such as submission system 150) and web publisher servers (e.g., each equipped with a validation evaluation system, such as evaluation system 250) can communicate with one another over the Internet.

Figure 2A:
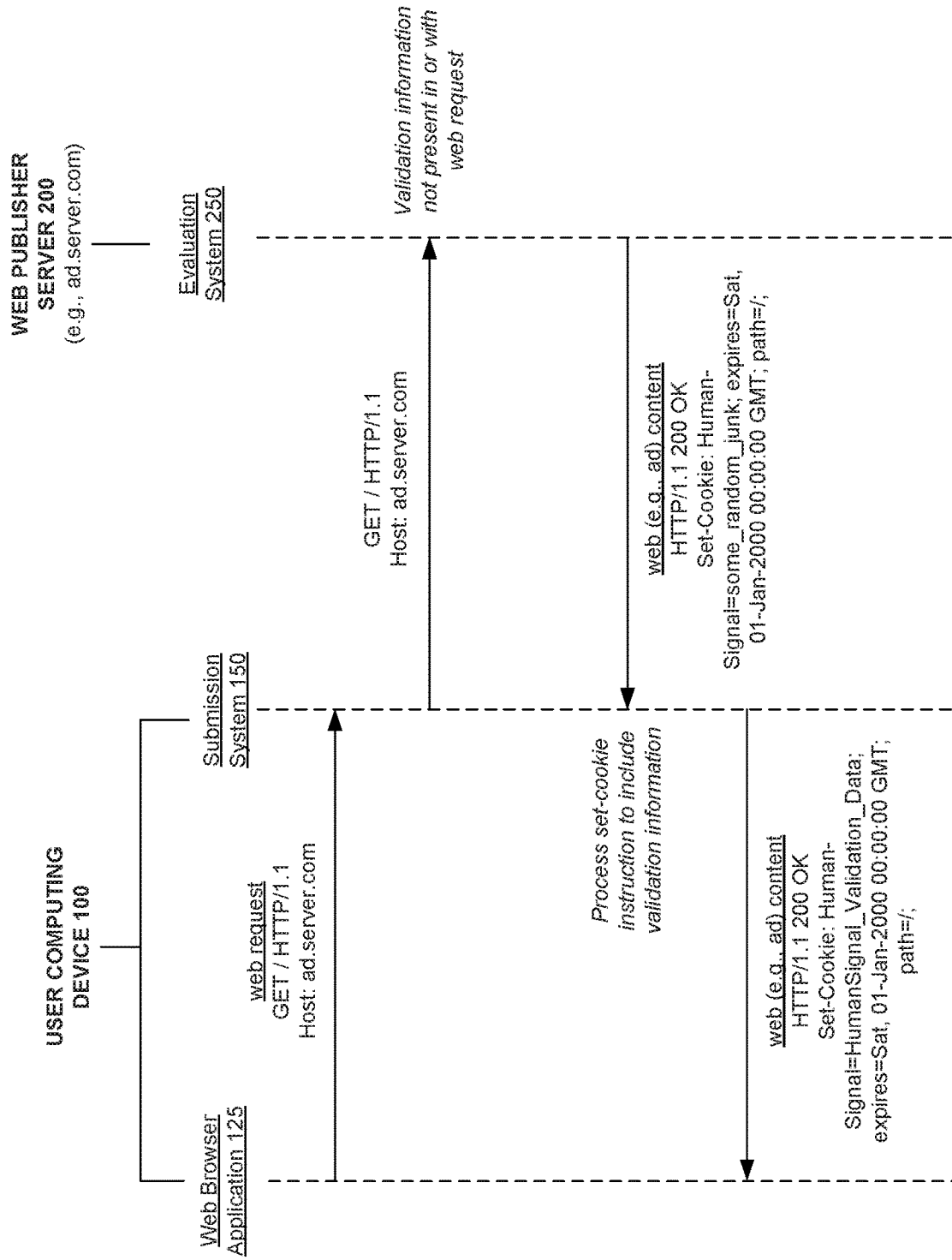
FIGS. 2a and 2b show exemplary flows of web traffic, involving signed cookies, between a user computing device and a web publisher server upon a first and subsequent access to the publisher server by the computing device, in accordance with an embodiment of the present invention.
Figure 2B:
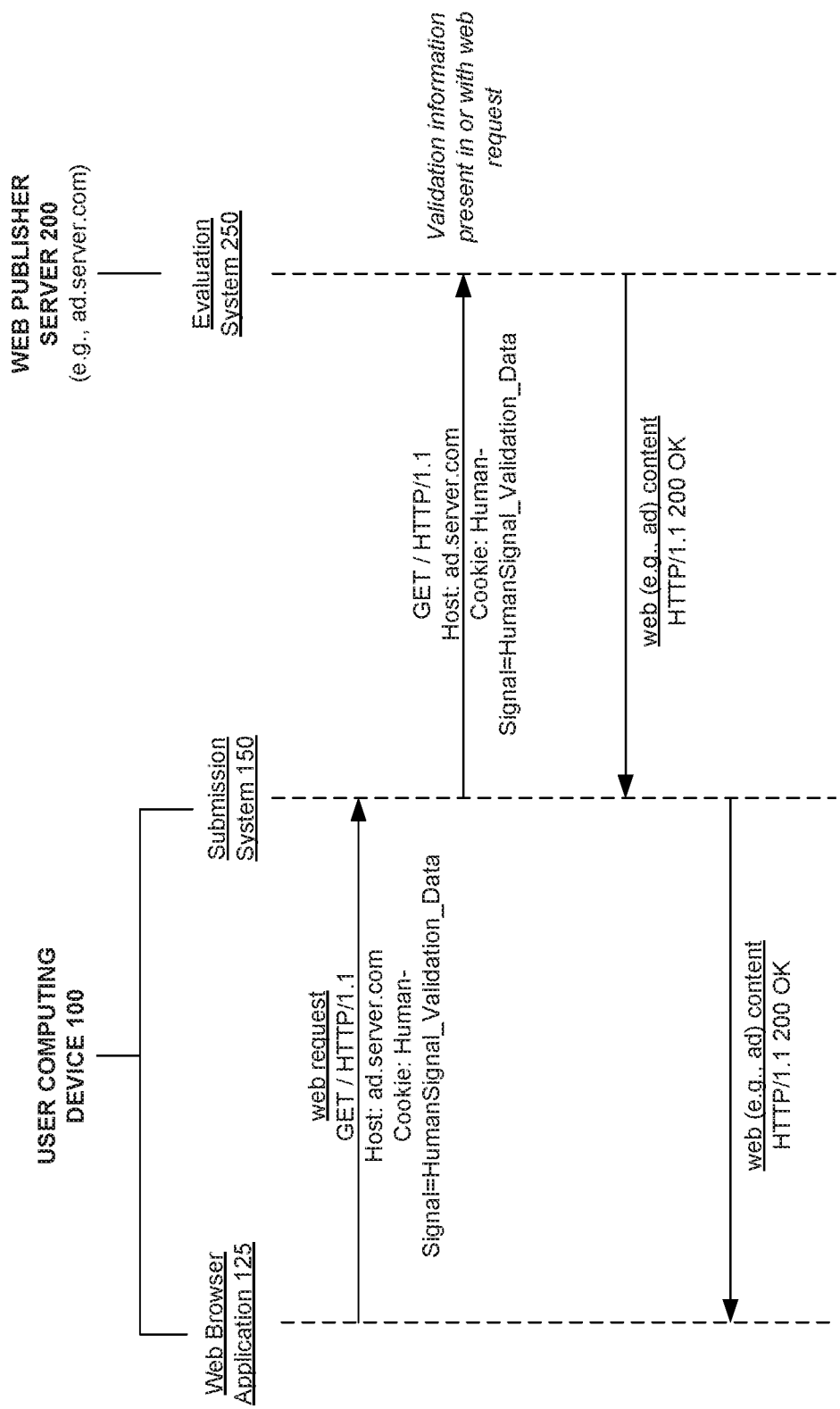

According to one embodiment, submission system 150 can communicate the validation information to web publisher servers via cookies. As is well-known, a cookie is simply a text file that a web server instructs a web browser to create and store upon its access to the site. It is usually created at the first visit, and may be subsequently updated upon future visits. For each cookie issued by a web site, the same information is stored on the web server upon a user's subsequent visit to the site, the server retrieves the cookie via the web browser to identify and, in some instances, authenticate the user. The text file typically contains information in the form of "name-value pairs", consisting of a variable name (e.g., User_ID) and an associated value e.g., A8A62818DF47), and is stored in a dedicated browser store (e.g., a folder) in non-volatile memory (e.g., a hard disk) on the user's computer. FIG. 2*a* illustrates an exemplary flow of web traffic, involving cookies, between computing device 100 and publisher server 200 upon a first access to the publisher server by browser application 125 of the computing device, in accordance with one embodiment. FIG. 2*b* illustrates an exemplary flow of web traffic between computing device 100 and publisher server 200 upon a subsequent access to the publisher server by browser application 125. In these examples, publisher server 200 hosts the domain 'ad.server.com', and computing device 100 and publisher server 200 communicate with one another via HTTP, HTTPS, or the like.

Referring to FIG. 2*a*, browser application 125 can issue a web-based request (e.g., GET/HTTP/1.1, Host: ad.server-.com), for example, in response to a user instruction to access the URL 'ad.server.com' for the first time. Submission system 150 may not alter or interfere with the transmission of this web-based request to publisher server 200. That is, submission system 150 may not include or append any validation information to the web-based request. Upon receipt of the request, publisher server 200 can reply by transmitting the requested web content to computing device 100. Additionally, evaluation system 250 can analyze the request for validation information. Since no validation information is included or appended in this initial request, evaluation system 250 can include validation request data in the form of a set-cookie instruction (e.g., Set-Cookie: Human_Signal=some_random_junk; expires:=Sat, 01-Jan-2000 00:00:00 GMT; path=/;) in the web content, which can, for example, indicate to computing device 100 that publisher server 200 is capable of processing validation information. Upon receipt of the web content, submission system 150 can analyze the set-cookie instruction for the validation request date, process it to include validation information (e.g., Set-Cookie: Human_Signal_Validated_Data; expires=Sat, 01-Jan-2000 00:00:00 GMT; path=/;), and send the processed set-cookie instruction to browser application 125. Browser application 125 can present the web content via one or more display windows, and can set the cookie according to the processed instruction and store it in memory (e.g., in the browser application's dedicated browser store).

Referring to FIG. 2b, browser application 125 can submit a subsequent web-based request to publisher server 200, for example, in response to another user instruction to access the URL 'ad.server.com'. Browser application 125 can additionally transmit the previously-set cookie along with the request. Upon receipt of the request and the cookie, publisher server 200 can reply by transmitting the requested content to computing device 100. Additionally, evaluation system 250 can detect the validation information in the cookie. In one embodiment, the mere presence of the validation information in the cookie is sufficient to indicate to evaluation system 250 that computing device 100 is equipped with a protection system, such as protection system 175, and thus content delivered by publisher server 200 to computing device 100 will likely be viewed by a real user. That is, evaluation system 250 does not process the validation information after it is detected. In another embodiment, evaluation system 250 additionally processes the detected validation information to verify the contents.

It is to be understood that the manipulation of web traffic by validation and evaluation systems 150 and 250 can be transparent to the operation of other web applications, such as browser application 125 of computing device 100 and complementary web applications of publisher server 200. Thus, no change to existing functions of any of these web applications may be required for the overall validation scheme to work. Moreover, the manipulation of web traffic by submission system 150 can also be transparent to the operation of web-based applications on web publisher servers not equipped with an evaluation system, such as evaluation system 250. Likewise, the manipulation of web traffic by evaluation system 250 can be transparent to the operation of web-based applications on user computing devices not equipped with a submission system, such as submission system 150.

It is to be appreciated that publisher server 200 can host the target domain (e.g., http://www.website.com) accessed by computing device 100, or alternatively, may be partnered with a web server hosting that domain. For example, publisher server 200 can belong to an ad publisher (e.g., ad exchange and/or network) partnered with a web publisher whose web site (e.g., http://www.website.com) is of interest to a user of computing device 100. In this scenario, existing communication schemes and/or protocols (e.g., ad serving arrangements) between the ad publisher's server(s) and the partnered web publisher's server may remain unchanged. However, validation information (and requests therefor, e.g., via validation request data) can be exchanged between the computing device and the publisher server via the partner server.

Figure 3:
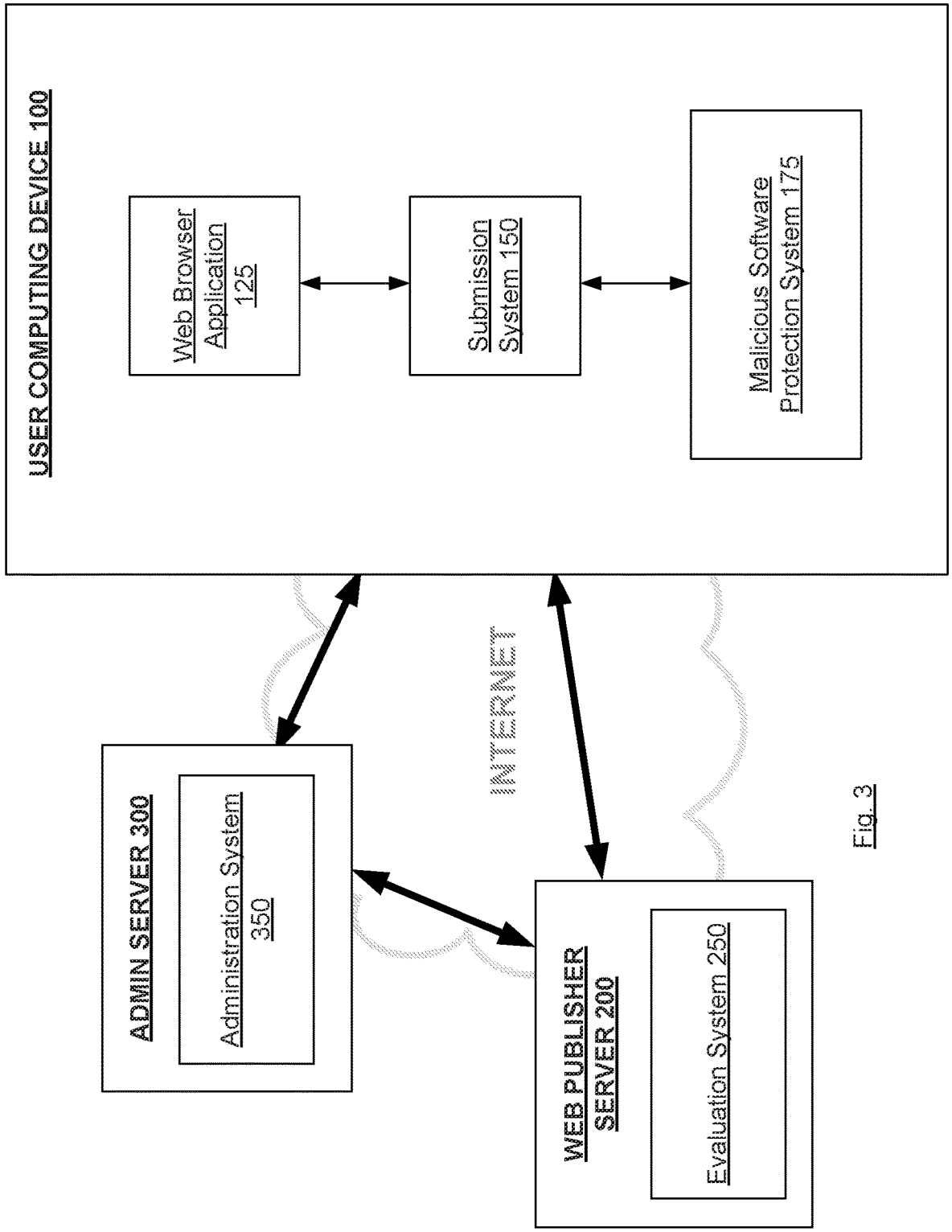
FIG. 3 is a schematic diagram illustrating a user computing device and a web publisher server in communication with a validation administration server, in accordance with an embodiment of the present invention.

According to preferred embodiments, the validation information can be encrypted to enhance the integrity of the validation process. FIG. 3 is a schematic diagram illustrating computing device 100 and publisher server 200 in communication with a validation administration server 300, in accordance with one embodiment. Administration server 300 can include one or more processors and memories, and can be equipped with one or more operating systems configured to execute software applications, such as a validation administration system 350. As one example, administration server 300 can be a proxy server, such as a hypertext transfer protocol ("HTTP") proxy server, a socket secure ("SOCKS") proxy server, a secure sockets layer ("SSL") proxy server, or the like. As another example, administration server 300 can be part of a private network, such as a virtual private network ("VPN").

Administration system 350 can be implemented by a third-party service provider, and can administer the validation scheme. Administration system 350 can include software implemented in one or more modules, configured to supply cryptographic data (e.g., keys) to computing devices and web publisher servers. The cryptographic information can, for example, be exchanged between administration server 300 and computing device 100 and publisher server 200 to secure web traffic between the computing device and the publisher server. In this way, authentication of encrypted data can be effected by only these entities.

In various embodiments, submission system 150 can be configured to request (e.g., periodically, such as once an hour or once a day) administration system 350 for cryptographic information. The cryptographic information can include or serve as validation information. Administration system 350 can issue the cryptographic information with preset expiration dates and/or times, which can enhance encryption security. Evaluation system 250 can similarly request cryptographic information from administration system 350, and can include this information in validation request data to computing device 100 and/or use this information to decrypt validation information received from submission system 150.

Figure 4:
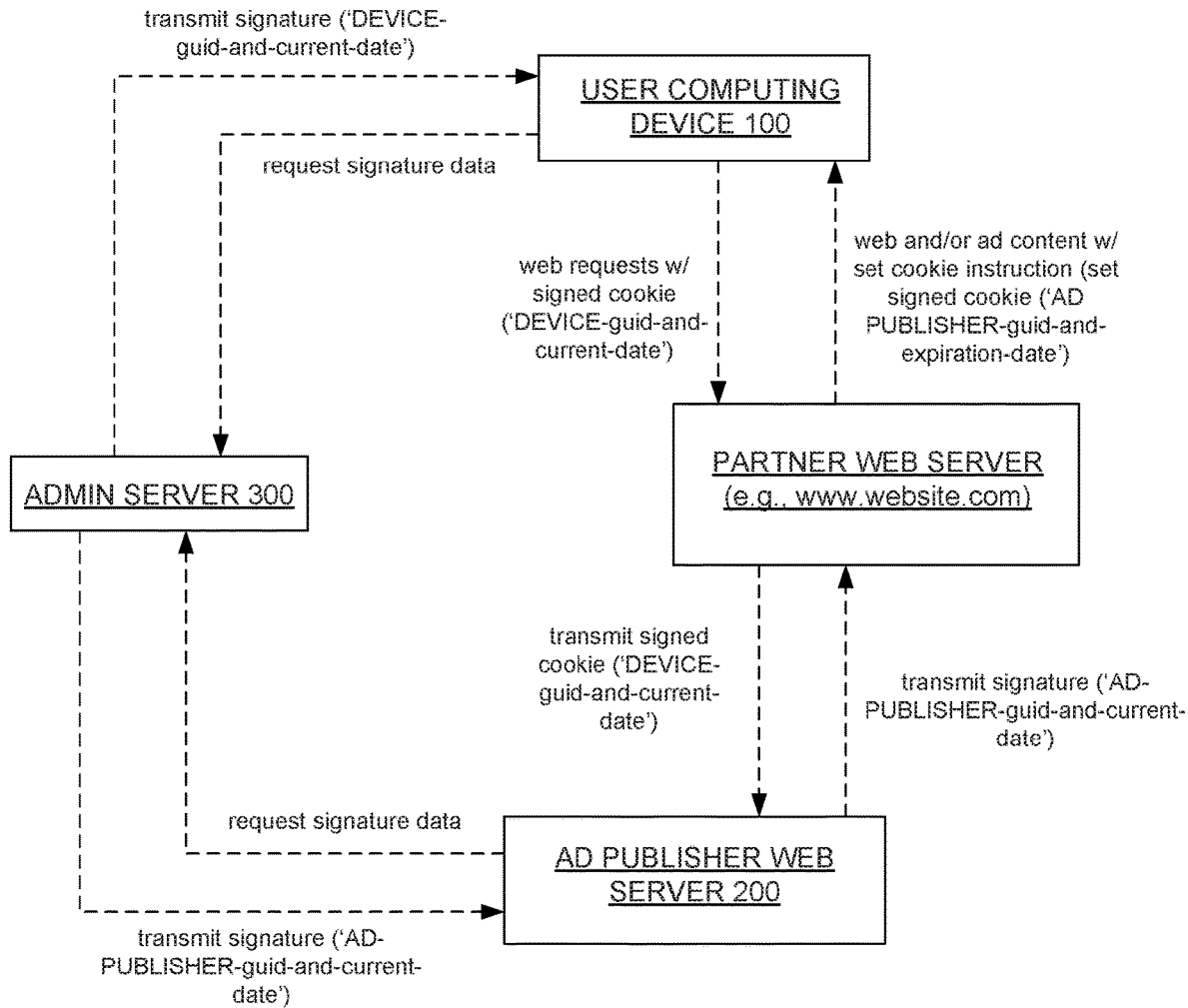
FIG. 4 shows an exemplary flow of web traffic between a user computing device, a web publisher server, and a validation administration server, in accordance with an embodiment of the present invention.

FIG. 4 illustrates an exemplary flow of web traffic between computing device 100, publisher server 200, and administration server 300, in accordance with one embodiment. In this example, publisher server 200 is an ad publisher that is partnered with a partner web server hosting the domain 'www.website.com'. Computing device 100, or more particularly, submission system 150, can transmit a request to administration server 300 (or administration system 350) for cryptographic information e.g., for a signature or an encoding of a randomly generated unique identifier and date information). In some embodiments, the request can include information indicative of the presence and/or status of protection system 175. That is, for example, the request can include protection data indicating that protection system 175 is active and has not detected any viruses or malware. This can, for example, serve as confirmation to administration system 350 that computing device is likely clean (e.g., free of malicious software). If administration system 350 determines that the computing device is clean, then administration system 350 can respond to the request by transmitting cryptographic information to computing device 100 (which can, e.g., include the signature or encoding 'DEVICE-guid-and-current-date'). If administration system 350 determines that the computing device is likely not clean (e.g., if no information indicating that a protection system is present and/or active on the computing device), then administration system 350 may not respond to the request or may, alternatively, transmit a message to submission system 150 indicating that certain protection requirements are not met. Publisher server 200, or more particularly, evaluation system 250, can similarly transmit a request to administration system 350 for cryptographic information (e.g., for a signature or an encoding of a unique identifier and date information). The administration system can respond to the request by transmitting the cryptographic information to evaluation system 250 (which can, e.g., include the signature or encoding 'AD-PUBLISHER-guid-and-expiration-date'). Evaluation system 250 can, in turn, transmit the cryptographic information to the partner web server. The partner web server can, for example, in response to a first content access request from computing device 100, transmit web content, ad content associated with the publisher server 200, and a signed set-cookie instruction (e.g., including the signature or encoding 'AD-PUBLISHER-guid-and-expiration-date') to computing device 100. By transmitting this signed set-cookie instruction, publisher server 200 is announcing to computing device 100 that the publisher server is capable of processing validation information. Any subsequent web-based request from computing device 100 to the partner web server can include a signed cookie (e.g., including the signature or encoding 'DEVICE-guid-and-current-date'). The partner web server can forward this cookie to publisher server 200, which can decrypt the cookie (e.g., using the cryptographic information provided to evaluation system 250 from administration system 350), and determine the likelihood that ad content delivered to computing device 100 (via the partner web server) will be viewed by a real user.

It is also to be appreciated that administration system 350 can use distinct identifiers for each computing device and web publisher server to keep track of the various entities utilizing the validation scheme. It is further to be appreciated that administration system 350 can use expiration dates and/or times in the validation scheme (e.g., in the cryptographic information transmitted to computing device 100 and publisher server 200), which can assist in device count and make the signature signal temporary for each publisher.

According to various embodiments, administration system 350 is configured to require computing devices and publisher servers to register, or otherwise, establish identification profiles or credentials in order to utilize the validation scheme. A web publisher can (e.g., via evaluation system 250) register with administration server 300 by submitting one or more of the publisher's domain(s) to server 300. For example, evaluation system 250 can issue an instruction to the processor(s) of publisher server 200 to transmit a communication including the domain(s) to administration system 350 as part of a request to utilize the validation scheme. In return, administration system 350 can generate (for example, using a random number generator) and provide to the web publisher, a unique identification value (e.g., a Partner_id), as well as a cryptographic key (e.g., a Public_key) that can be used to decrypt validation information received by the web publisher from computing devices. For each registered domain, administration system 350 can also generate and/or provide a string (e.g., a domain_payload string) that identifies the domain to a validation submission system, such as submission system 150. The string can include a prefix (e.g., the prefix 'vhr_') as well as an encoding of the domain, the identification value, and a service expiration date and/or time. In certain embodiments, administration system 350 can provide the cryptographic key (e.g., Public_key) and the payload string (e.g., domain_payload) to publisher server 200 via one or more script files [e.g., one or more HyperText Markup Language (HTML) or hypertext preprocessor ("PHP") files, or files of other like scripting languages]. Administration system 350 can also provide common code (e.g., a base class) to evaluation system 250 in the same or similar files for use in the validation scheme. Administration system 350 can provide all of this information (e.g., as server-side logic) to publisher server 200 by, for example, instructing the processor(s) of administration server 300 to transmit the information via one or more network interface devices on administration server 300.

A computing device can similarly identify itself to administration system 350, for example, via submission system 150. For example, submission system 150 can issue an instruction to the processor(s) of computing device 100 to transmit a request to administration system 350 to utilize the validation scheme. In response, administration system 350 can generate (for example, using a random number generator) a unique identifier (e.g., a device_id) for computing device 100. Administration system 350 can also generate and provide a unique string (e.g., a vhs_payload string) to each computing device, or more particularly, to each submission system 150. Administration system 350 can provide all of this information to computing device 100 by, for example, instructing the processor(s) of administration server 300 to transmit the information via one or more network interface devices on administration server 300. FIG. 5 is a portion of an exemplary vhs_payload string. FIG. 6 is a table illustrating an exemplary array of contents of a vhs payload string (e.g., prior to encoding and/or encryption or after the string is decoded and/or decrypted), in accordance with one embodiment. The vhs_payload string can, for example, be a base64url (e.g., RFC 4648 section 5, with no padding characters) encoded string protected by the Rivest-Shamir-Adleman cryptosystem ("RSA encryption"). For ease of identifying the string as being associated with the validation scheme, the base64url string can be prefixed (e.g., by the prefix The submission system can include or append this string to web (e.g., HTTP or HTTPS) traffic between the computing device and other registered web publisher servers. For example, in a web transaction between computing device 100 and publisher server 200 (and involving a validation scheme administered by administration server 300), evaluation system 250 can include the web publisher's domain_payload string in HTTP traffic to computing device 100. Upon receipt of the payload domain string by computing device 100, submission system 150 can process the domain_payload string in the HTTP traffic, for example, by replacing it with the assigned vhs_payload string. Evaluation system 250 can receive the vhs_payload string in subsequent HTTP traffic from computing device 100, and can decrypt it, for example, to verify its validity.

Figure 7:
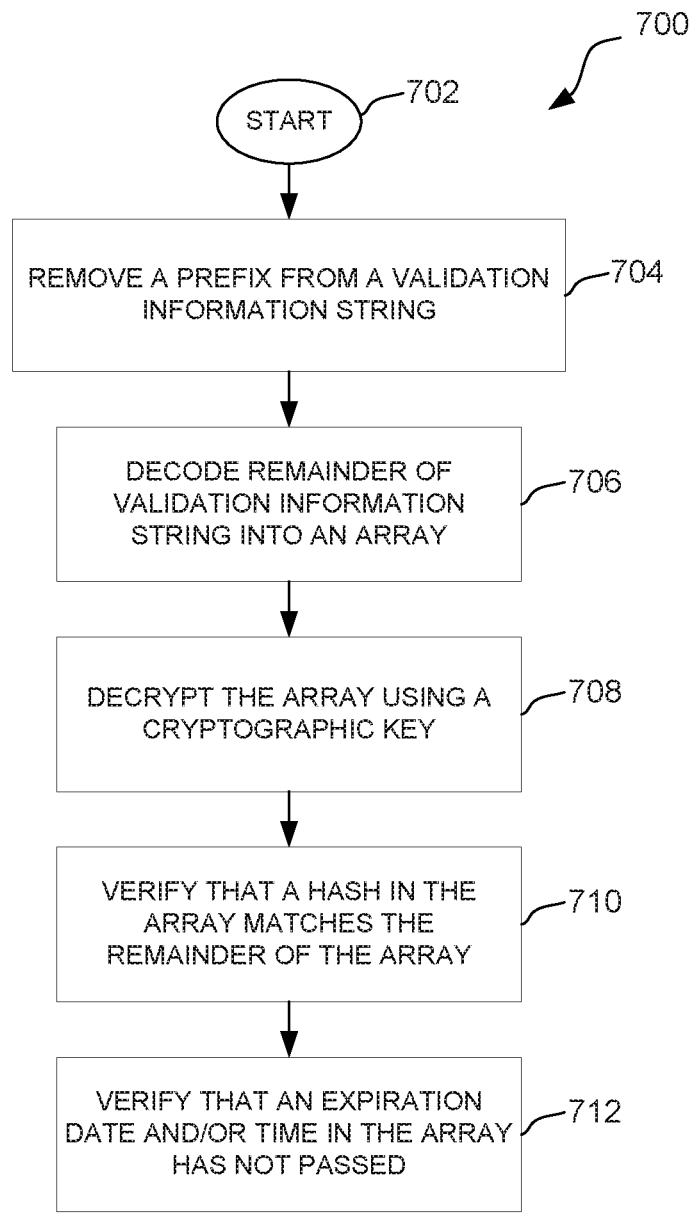
FIG. 7 is a flowchart illustrating an exemplary process for decoding and/or decrypting a validation information string, in accordance with an embodiment of the present invention.

An exemplary process 700 for decoding and/or decrypting a vhs_payload string is shown in FIG. 7. Process 700 can, for example, be implemented by evaluation system 250 to reveal the contents of the string (e.g., the contents shown in FIG. 5) and to verify its validity. Process 700 can begin at step 702. At step 704, the process can include removing a prefix from the string. For example, the process can include removing the prefix 'vhs$_{13}$' from the string shown in FIG. 5. At step 706, the process can include decoding the remainder of the string into an array. For example, the process can include decoding the remaining base64url string into an array. At step 708, the process can include decrypting the array using a cryptographic key. For example, the process can include decrypting the array with a Public_key provided to publisher server 200 from administration system 350. At steps 710 and 712, the process can include verifying that a hash in the array matches the remainder of the array, and that an expiration date and/or time in the array has not passed.

It should be understood that the steps shown in process 700 are merely illustrative and that existing steps may be modified or omitted, additional steps may be added, and the order of certain steps may be altered.

It is to be appreciated that the validation process can be implemented in a variety of ways. According to one embodiment, validation is implemented via a field signal. Under the instruction or control of evaluation system 250, web publisher 200 can, for example, deliver web content, along with validation request data, to computing device 100. The validation request data can be included in a web (e.g., .htm) file containing one or more functions (e.g., written in JavaScript or a similar language) configured to issue a request to the server [e.g., via an XML.HttpRequest( ) call]. The validation request data can be an encoded HTTP header, and more particularly, a domain_payload string included in a field header a non-standard field or a part of a non-standard field) of the function. The field signal can be in the form of 'ANY-NAME: <domain_payload>', where the phrase 'any-name' can be any value that the web publisher chooses. The function(s) can also be configured to invoke one or more server-side functions (e.g., included in one or more .php files or files written in a similar language) to transmit the domain_ payload string to computing device 100, and cause browser application 125 to forward the domain_payload string to submission system 150. The VHS logic can identify the domain_payload string by prefix, replace the string with a vhs_payload stung, and transmit the vhs_payload string to browser application 125. Browser application 125 can subsequently deliver the vhs_payload string to publisher server 200. One or more of the server-side functions can process the received vhs_payload string to verify its validity. Thus it can also be part of a composition, such as a single field in a multiple field cookie.

According to another embodiment, validation is implemented via a url signal, where the domain_payload string is included in a URL query string, such as, for example, <http://your.server.com/yourContents?any_name=<domain_payload>. Under the instruction or control of evaluation system 250, web publisher 200 can, for example, deliver web content, along with validation request data, to computing device 100. The validation request data can be included in one or more web files (e.g., HTML files) defining an inner frame ("iframe") in a web page to be loaded by the web browser application on the computing device. The web file can include a function that makes a call-in to the server (using the URL query string) from the inner frame when the web page is loaded.

Figure 8A:
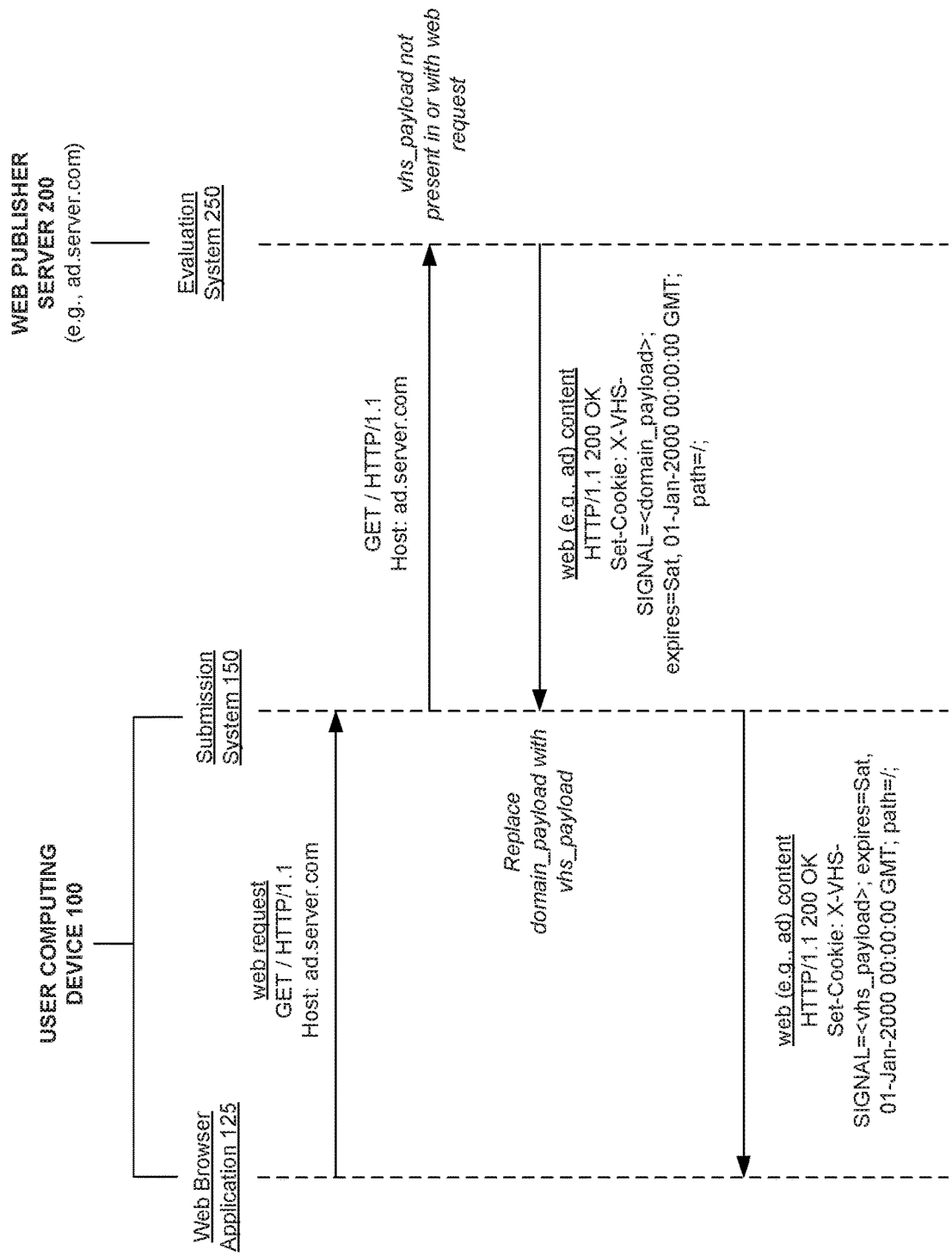
FIGS. 8a and 8b show exemplary flows of web traffic, involving cookies containing validation request data and validation information in the form of data strings, between a user computing device and a web publisher server upon a first and subsequent access to the publisher server by the computing device, in accordance with an embodiment of the present invention.
Figure 8B:
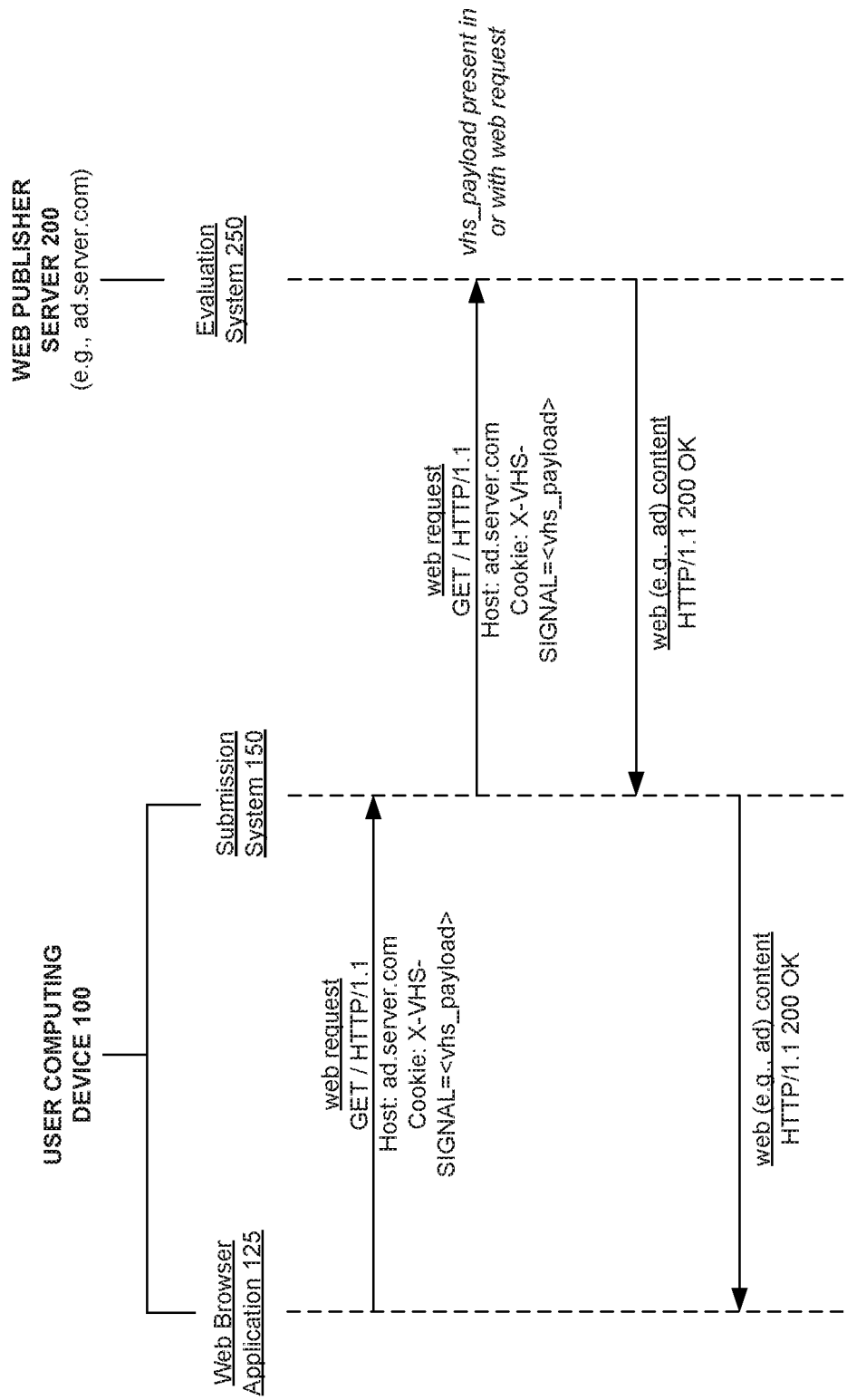

According to a further embodiment, the validation scheme is implemented via cookies (which can be similar to the cookie implementation described above with respect to FIGS. 2a and 2b). In this implementation, the domain_payload string can be included in an HTTP set-cookie instruction (e.g., Set-Cookie: ANY_NAME=<domain_payload>). By inserting the domain_payload string in a cookie, a submission system (such as submission system 150) on the user computing device can detect the string and process it for use in later web-based transmissions to the publisher server. FIG. 8a illustrates an exemplary flow of web traffic, involving cookies, between computing device 100 and publisher server 200 upon a first access to the publisher server by browser application 125. FIG. 8b illustrates an exemplary flow of web traffic between computing device 100 and publisher server 200 upon a subsequent access to the publisher server by browser application 125.

Referring to FIG. 8a, browser application 125 can issue a web-based request (e.g., GET/HTTP/1.1, Host: ad.server.com), for example, in response to a user instruction to access the URL 'ad.server.com' for the first time. Submission system 150 may not alter or interfere with the transmission of this request to publisher server 200. That is, submission system 150 may not include or append any validation information, such as the vhs_payload string, to the request. Upon receipt of the request, publisher server 200 can reply by transmitting the requested web content to computing device 100. Additionally, evaluation system 250 can analyze the request for the vhs_payload string. Since no validation information is included or appended in this initial request, evaluation system 250 can include validation request data in the form of a set-cookie instruction (e.g., Set-Cookie: X-VHS-SIGNAL=<domain_payload>; exp- ires=Sat, 01-Jan-2000 00:00:00 GMT; path=/;) in the web content, which can, for example, indicate to computing device 100 that publisher server 200 is capable of processing vhs_payload strings. Upon receipt of the web content, submission system 150 can analyze the set-cookie instruction for the domain_payload string (e.g., by identifying a prefix thereof, such as the prefix 'vhr_'), process it by replacing the domain_payload string with the vhs_payload string previously received from administration server 300 (e.g., Set-Cookie: X-VHS-SIGNAL=<vhs_payload>.; exp- ires=Sat, 01-Jan-2000 00:00:00 GMT; path=/;), and send the processed set-cookie instruction to browser application 125. Browser application 125 can present the web content via one or more display windows, and can set the cookie according to the processed instruction and store it in memory (e.g., in the browser application's dedicated browser store).

Referring to FIG. 8b, browser application 125 can submit a subsequent web-based request to publisher server 200, for example, in response to another user instruction to access the URL 'ad.server.com'. Browser application 125 can additionally transmit the previously-set cookie along with the request. Upon receipt of the request and the cookie, publisher server 200 can reply by transmitting the requested content to computing device 100. Additionally, evaluation system 250 can analyze the cookie for the vhs_payload (e.g., by identifying a prefix thereof, such as the prefix 'vhs_'). In one embodiment, the mere presence of the vhs_payload string in the cookie is sufficient to indicate to evaluation system 250 that computing device 100 is equipped with a protection system, such as protection system 175, and thus content delivered by publisher server 200 to computing device 100 will likely be viewed by a real user. In another embodiment, evaluation system 250 can process the detected vhs_payload string (for example, as described above with respect to FIG. 7) to verify the contents.

Accordingly, a content access validation system and method advantageously reveals to web publishers the likelihood that content transmitted (or to be transmitted) to user computing devices will be viewed by real users (and not automated computer programs).

It should be understood that the foregoing subject matter may be embodied as devices, systems, methods and/or computer program products. Accordingly, some or all of the subject matter may be embodied in hardware and/or in software (including firmware, resident software, microcode, state machines, gate arrays, etc.). Moreover, the subject matter may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate or transport the program for use by or in connection with the instruction execution system, apparatus, or device.

The computer-usable or computer-readable medium may be, for example, an electronic, magnetic, optical, electromagnetic, infrared, or semiconductor system, apparatus, device, or propagation medium. Computer-readable media may comprise computer storage media and communication media.

Computer storage media includes volatile and nonvolatile, removable and non-removable media implemented in any method or technology for storage of information such as computer-readable instructions, data structures, program modules or other data. Computer storage media includes RAM, ROM, EEPROM, flash memory or other memory technology that can be used to store information and that can be accessed by an instruction execution system.

Communication media typically embodies computer-readable instructions, data structures, program modules or other data in a modulated data signal such as a carrier wave or other transport mechanism and includes any information delivery media (wired or wireless). A modulated data signal can be defined as a signal that has one or more of its characteristics set or changed in such a manner as to encode information in the signal.

When the subject matter is embodied in the general context of computer-executable instructions, the embodiment may comprise program modules, executed by one or more systems, computers, or other devices. Generally, program modules include routines, programs, objects, components, data structures and the like, which perform particular tasks or implement particular abstract data types. Typically, the functionality of the program modules may be combined or distributed as desired in various embodiments.

It will thus be seen that the objects set forth above, among those made apparent from the preceding description and the accompanying drawings, are efficiently attained and, since certain changes can be made in carrying out the above methods and in the constructions set forth for the systems without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein des rib d, and all statements of the scope of the invention, which, as a matter of language, might be said to fall therebetween.

What is claimed is:

1. A content access validation submission method, involving a user computing device in communication with a web publisher server and a third party server over the Internet, the user computing device having at least one data processor, the method comprising:
   receiving, at the user computing device and from the web publisher server, web content including a domain string;
   identifying, using the at least one data processor, data indicative of a request for validation information in the web content, wherein the validation information is associated with an operational status of a software protection system on the user computing device, wherein the software protection system is an anti-virus or anti-malware application;
   receiving, at the user computing device and from the third party server, a unique validation information string responsive to determining that the software protection system is active;
   replacing, at the user computing device, the domain string received from the web publisher with the unique validation information string received from the third party server;
   sending, using the at least one data processor, to the web publisher server, a communication containing an additional content request, a confirmation of the active status of the software protection system and the unique validation information string; and
   after sending the communication to the web publisher server, receiving, at the user computing device and from the web publisher server, the requested additional content;
   validating, by the web publisher server, an identity of the user computing device based on: removing a prefix from the unique validation information string; decoding a remainder of the string into an array; and decrypting the array using a cryptographic key; wherein the validating further comprises: verifying that a hash in the array matches a remainder of the array; and confirming that the payload string expiration time has not passed.

2. The method of claim 1, wherein the user computing device receives the unique validation information string after
   sending, to the third party server and using the at least one data processor, information indicative of the software protection system being active and an absence of malware on the user computing device.

3. The method of claim 2, further comprising:
   periodically receiving the validation information from the third party server based on the information.

4. The method of claim 1, wherein the web content comprises a cookie instruction, and wherein the data indicative of the request for the validation information is included in the cookie instruction.

5. The method of claim 4, further comprising:
   identifying a validation date in the cookie instruction; and
   setting a cookie based on the identified validation date in a browser application of the user computing device.

6. The method of claim 1, wherein the data is formatted in a predefined manner, and wherein the web content comprises a request header.

7. The method of claim 6, wherein the analyzing the web content comprises scanning for a string included in the request header indicative of the web publisher server's capability of processing validation information.

8. The method of claim 1, wherein the web content comprises a uniform resource locator ("URL") query.

9. The method of claim 8, wherein analyzing the web content comprises scanning the URL query for a string having a predefined prefix.

10. The method of claim 1, wherein the sending the communication to the web publisher server comprises providing the communication to a web browser application for transmission to the web publisher server.

11. The method of claim 1, wherein the data comprises an identifier associated with the web publisher server, and at least one of an expiration date and an expiration time.

12. The method of claim 1, wherein the unique validation information string comprises an encoded unique device identifier associated with the user computing device, a string creation time, a string expiration time, and a hash of:
   the identifier, the creation time, and the expiration time.

13. The method of claim 12, wherein the hash is an output of a secure hash algorithm.

14. The method of claim 13, wherein the secure hash algorithm comprises a function from one of the SHA-1 family and the SHA-2 family.

15. A content access validation evaluation method, involving a web publisher server in communication with a user computing device and a third party sever over the Internet, the web publisher server having at least one data processor, the method comprising:
  transmitting web content from the web publisher server to the user computing device, the web content comprising validation request data indicative of a request to provide validation information corresponding to an active operational status of a software protection system on the user computing device, wherein the software protection system is an anti-virus or anti-malware application, and wherein the validation request data includes a domain string in a header formatted in a predefined manner;
  receiving, at the web publisher server and from the user computing device, a communication containing a subsequent content request and the validation information, wherein the validation information includes a unique validation information string that is indicative of the active operational status of the software protection system and responsive to the domain string of the transmitted web content;
  verifying, using the at least one data processor, a validity of the unique validation information string based on a unique identification value provided by the third party sever; and
  sending, using the at least one data processor, additional web content in response to the subsequent content request;
  validating, by the web publisher server, an identity of the user computing device based on: removing a prefix from the unique validation information string; decoding a remainder of the string into an array; and decrypting the array using a cryptographic key; wherein the validating further comprises: verifying that a hash in the array matches a remainder of the array; and confirming that the payload string expiration time has not passed.

16. The method of claim 15, wherein the web content comprises a uniform resource locator (URL) query string, the method further comprising:
  after receiving the communication containing the subsequent content request and the validation information, requesting the third party server for utilizing a validation scheme associated with the domain string.

17. The method of claim 16, wherein the transmitting the web content comprises:
  transmitting a web file including the web content, wherein the web file is indicative of an I-frame associated with a web page to be loaded by a browser of the user computing device.

18. The method of claim 17, wherein the web file includes a function configured to generate a call-in from the I-frame of the web page and to the web publisher server using the URL query string.

19. The method of claim 15, wherein the validation request data comprises a publisher data string encoding a domain name, an identifier associated with the web publisher server, and at least one of an expiration date and an expiration time.

20. The method of claim 15, wherein the validation information comprises a user data string encoding an identifier associated with the user computing device, a creation time, an expiration time, and a hash of the identifier, the creation time, and the expiration time.

21. The method of claim 20, wherein the hash is an output of a secure hash algorithm.

22. The method of claim 21, wherein the secure hash algorithm comprises a function from one of the SHA-1 family and the SHA-2 family.

23. The method of claim 20, further comprising processing the validation information based on:
  removing a prefix from the user data string;
  decoding a remainder of the data string into an array; and
  decrypting the array using a cryptographic key.

24. The method of claim 23, wherein the processing the validation information further comprises:
  verifying that the hash in the array matches the remainder of the array; and
  confirming that at least one of an expiration date and an expiration time in the array has not passed.

25. A content access validation system administered by a validation administration server in communication with a user computing device and a web publisher server, each of the user computing device and the web publisher server being registered with the administration server to utilize a content access validation process, the system comprising:
  an administration module resident in memory on the administration server and executable by at least one data processor of the administration server;
  a submission module resident in memory on the user computing device and executable by at least one data processor of the user computing device; and
  an evaluation module resident in memory on the publisher server and executable by at least one data processor of the publisher server; wherein:
    the administration module is configured to:
      receive requests from the submission module and the evaluation module for cryptographic information associated with content access; and
      cause, using the at least one data processor of the administration server, cryptographic information to be transmitted to the computing device and the publisher server in response to the requests, wherein the cryptographic information includes a unique validation information string associated with the submission module;
    the submission module is configured to:
      receive, from the evaluation module, web content comprising validation request data indicative of a request to provide validation information corresponding to an active operational status of a software protection system on the user computing device, wherein the software protection system is an anti-virus or anti-malware application, and wherein the validation request data includes a domain string in a header formatted in a predefined manner;
      receive, from the administration module, the unique validation information string responsive to determining that the software protection system is active;
      replace, using the at least one data processor of the computing device, the domain string received from the evaluation module with the unique validation information string received from the administration module; and send, using the at least one data processor of the computing device and to the evaluation module, an additional content request, a confirmation of the active status of the software protection system and the unique validation information string; and the evaluation module is configured to:
receive the additional content request and the unique validation information string from the submission module; and
process the unique validation information string to verify its validity based on removing a prefix from the unique validation information string and decrypting a remainder of the string using the cryptographic information provided to the evaluation module from the administration module.

26. The system of claim 25, wherein the submission module is further configured to:
responsive to detecting the active software protection system on the computing device, requesting, from the administration module, the unique validation information string.

27. The system of claim 26, wherein the submission module is configured to detect the active software protection system on the computing device by instructing an operating system of the computing device to locate the active software protection system.

28. The system of claim 26, wherein the administration module is configured to cause the cryptographic information to be transmitted to the computing device based on protection data provided by the submission module indicative of the active software protection system and an absence of malware on the computing device.

29. The system of claim 25, wherein the cryptographic information provided to the submission module from the administration module comprises a unique identifier.

30. The system of claim 25, wherein the validation information comprises a data string encoding the unique identifier, and wherein the cryptographic information provided to the evaluation module from the administration module comprises a public key.

31. The system of claim 25, wherein the unique identifier is randomly generated.

32. The system of claim 25, wherein the evaluation module is further configured to:
cause, using the at least one data processor of the publisher server, the web content to be transmitted from the publisher server to the computing device if the validity of the unique validation information string has been verified.

* * * * *